United States Patent
Khurana et al.

(10) Patent No.: US 9,699,674 B2
(45) Date of Patent: *Jul. 4, 2017

(54) TECHNIQUE FOR TESTING WIRELESS NETWORK LOAD PRODUCED BY MOBILE APP-CARRYING DEVICES

(71) Applicant: Rohde & Schwarz Asia Pte. Ltd., Singapore (SG)

(72) Inventors: Hanush Khurana, Singapore (SG); Sellathamby Suthaharan, Singapore (SG); Rajashekar Durai, Singapore (SG)

(73) Assignee: Rohde & Schwarz GmbH & Co. KG, Munich (DE)

(*) Notice: Subject to any disclaimer, the term of this patent is extended or adjusted under 35 U.S.C. 154(b) by 31 days.

This patent is subject to a terminal disclaimer.

(21) Appl. No.: 14/630,628

(22) Filed: Feb. 24, 2015

(65) Prior Publication Data

US 2016/0105810 A1  Apr. 14, 2016

(30) Foreign Application Priority Data

Oct. 14, 2014  (SG) .............. 10201406596X

(51) Int. Cl.
*H04J 1/16* (2006.01)
*H04W 24/06* (2009.01)

(52) U.S. Cl.
CPC .................. *H04W 24/06* (2013.01)

(58) Field of Classification Search
None
See application file for complete search history.

(56) References Cited

U.S. PATENT DOCUMENTS 7,797,132 B1  9/2010 Lele
8,982,723 B2 * 3/2015 Wang ............. H04L 63/20
                                                  370/252

(Continued)

FOREIGN PATENT DOCUMENTS

CN  103986788 A  *  8/2014
GB  2511027 A      8/2014
WO  WO2013119205 A1  8/2013

OTHER PUBLICATIONS

IPOS, "IP Office of Singapore Search Report", Application No. 10201406596X, May 29, 2015.

(Continued)

*Primary Examiner* — Kibrom T Hailu
(74) *Attorney, Agent, or Firm* — Potomac Technology Law, LLC

(57) ABSTRACT

An approach for the analysis of the impact of over the top (OTT) applications is provided, which operate "over the top" of the network applications, with respect to network performance and power consumption on mobile devices. A wireless network for an application-carrying device separate from wireless communications network test equipment is simulated. A wireless communications interface between the simulated network and the application-carrying device is monitored. The monitoring comprises measuring signaling data on a control plane, and measuring application data on a user plane related to at least one application implemented on the application-carrying device. Cross-layer measurement data is generated based on the measured signaling data and application data. The signaling data and the application data are measured on the basis of a common time reference of the test equipment.

17 Claims, 4 Drawing Sheets

(56) References Cited

U.S. PATENT DOCUMENTS

| | | | |
|---|---|---|---|
| 2006/0282247 A1 | 12/2006 | Brennan et al. | |
| 2011/0257923 A1* | 10/2011 | Boulton | G01S 5/0221 |
| | | | 702/117 |
| 2012/0322479 A1* | 12/2012 | Hakola | H04W 24/04 |
| | | | 455/507 |
| 2013/0051282 A1* | 2/2013 | Lim | H04L 12/1403 |
| | | | 370/259 |
| 2013/0072127 A1* | 3/2013 | Huang | H04M 1/24 |
| | | | 455/67.11 |
| 2014/0047417 A1 | 2/2014 | Kaasila et al. | |
| 2014/0289561 A1* | 9/2014 | Majumdar | G06F 11/263 |
| | | | 714/32 |
| 2015/0051872 A1* | 2/2015 | Arora | G06F 11/3428 |
| | | | 702/186 |
| 2015/0323645 A1* | 11/2015 | Siomina | H04W 24/10 |
| | | | 455/456.1 |

OTHER PUBLICATIONS

Aucinas, et al., "Staying Online While Mobile: The Hidden Costs", CoNEXT, Santa Barbara, Dec. 2013.
Cambridge & Telefonica, "RILAnalyzer", http://rilanalyzer.smart-e.org/.
Vallina-Rodriguez, et al., "RILAnalyzer: a Comprehensive 3G Monitor on Your Phone", IMC, Barcelona, Oct. 2013.

* cited by examiner

| Test Name 401 | RRC Release 408 | C-DRX 410 | Duration (Minutes) 412 | OTT App 422 | Data (Kbyte) 420 | IP Connect-ion(s) 418 | Signaling count (L2/L3) 424 | LTE RRC State(s) [%] 426 | | | Avg Power (mW) 428 |
|---|---|---|---|---|---|---|---|---|---|---|---|
| | | | | | | | | CONN | C-DRX | IDLE | |
| LTE OTT-TC1 402 | Disabled | Disabled | 10 | App A | 30 | 10 | 10 | 100 | 0 | 0 | 1700 |
| | | | | App B | 40 | 20 | | | | | |
| LTE OTT-TC2 404 | 5 seconds | Disabled | 10 | App A | 90 | 30 | 30 | 80 | 0 | 20 | 1600 |
| | | | | App B | 120 | 60 | | | | | |
| LTE OTT-TC3 406 | 5 seconds | Long DRX | 10 | App A | 180 | 60 | 20 | 60 | 20 | 40 | 1500 |
| | | | | App B | 240 | 120 | | | | | |

TECHNIQUE FOR TESTING WIRELESS NETWORK LOAD PRODUCED BY MOBILE APP-CARRYING DEVICES

PRIORITY

This application claims priority of Singapore Patent Application No. 10201406596X, filed Oct. 14, 2014.

TECHNICAL FIELD

Embodiments of the invention relate to a method performed by test equipment of a wireless communications network test environment in interaction with an application-carrying device, e.g., a smartphone having installed a plurality of apps. Embodiments of the invention further relate to corresponding software, use, hardware, and data set aspects.

BACKGROUND

Mobile devices such as smartphones and tablet PCs are more and more superseding traditional desktop PCs as the primary access medium to the Internet. The rising popularity of third-party applications, the mobile applications or apps, contribute to heavily increasing data volume in wireless communications networks. Apps for voice over IP, instant messaging, video on demand, social networking, push services such as weather services, newsletter services, etc. are gradually replacing and/or adding to well-established services such as SMS and MMS. According to typical configurations, between 30 and 100 apps may be installed on a smartphone.

The rapid growth of third-party applications increases the risk of said apps considerably affecting the use of a smartphone or tablet PC. Apps can, for instance, drain the battery, even when they are not actively used and users may then experience rapidly discharging batteries. Moreover, apps can create huge amounts of data and signaling traffic in an operator's LTE or WCDMA network. Therefore, the success of mobile apps exposes new issues that were not initially expected, namely on mobile network providers (MNOs) in terms of dynamic load management and on mobile device manufacturers in terms of battery life.

More specifically, applications intended to be installed on mobile devices are also called over the top (OTT) applications as they operate "over the top" of the network, which includes that they can be the cause of considerable data traffic not only or primarily with a view on bandwidth usage, but at least also with a view on the resource usage of the lower layers, where they can cause considerable radio signaling load, e.g., due to their periodic Heartbeat signals and push messages exchanged with the respective application servers and even when the phone and/or app is not being actively used. The signaling load may deteriorate services for normal voice calls, SMS etc. and has even led to network service disruptions ('signaling storms'). A considerable amount of signaling can also have a significant impact on the battery life of app-carrying smartphones.

As opposed to wired and WiFi (WLAN) networks, cellular networks have a clearly separated control-plane for signaling traffic and user-plane for user traffic, respectively. However, the control plane may impact on user plane performance and vice-versa. Specifically, signaling messages on the control plane, e.g., Layer-2 and Layer-3 (L2/L3) messages may over/load and stress network infrastructure. For example, in order that an OTT application may exchange data in the user plane with the application service, which as such may comprise a small amount of IP data only, a radio communication link has to be established. This may include radio bearer (re)configuration, setup of access layer security, sending of service request messages, etc. Once connected, the smartphone remains in a mode in which it can exchange data with the network for a duration based on one or more network specific timers. Even if no further signaling is required, said mode consumes a considerable amount of energy at the mobile device.

It turns out challenging for the network operators and mobile device manufacturers to analyze network (over)load problems suspected to be due to OTT apps on mobile devices and to improve network response to smartphones with an ever increasing number of apps.

Network-centric system test approaches may comprise developing test scenarios primarily for the control plane, wherein a considerable signaling load supposed to be similar to that of a plurality of app-carrying smartphones is generated/simulated and is applied to a test network supposed to be configured similar to an existing network.

On a more fine-grained function-test level, use of known test equipment can be contemplated which can monitor a wireless interface between network and mobile device in the control plane, i.e., can interpret a signaling on said interface. The equipment is adapted for analyzing specific communications systems such as, e.g., the RRC (Radio Resource Control) links between RNC (Radio Network Controller) and base station (eNodeB) of LTE networks and mobile devices. However, normally higher layer user plane traffic, such as IP traffic, cannot be analyzed, therefore it is unclear how such test equipment can help with the analysis of impact of OTT applications on a network load.

Specific analyzer devices or tools are also available for monitoring, measuring and analyzing IP traffic. IP data packets can be assigned to individual applications, such that end-to-end data traffic and protocol analysis can be generated. However, again, it is unclear how such tools may assist in the analysis of network load due to OTT applications.

Narseo et al. "RILAnalyzer: a Comprehensive 3G Monitor On Your Phone" (http://rilanalyzer.smart-e.org/) describes, as a handset-oriented approach, a software tool that provides mechanisms to perform network analysis from within a mobile device.

Low-level (control-plane) radio information and cellular network control-plane data can be recorded, as well as user-plane data, together with traffic load and network configurations.

There is a need, therefore, for an approach for the analysis of the impact of over the top (OTT) applications, which operate "over the top" of the network applications, with respect to network performance and power consumption on mobile devices.

SUMMARY

Embodiments of the present invention advantageously address the foregoing requirements and needs, as well as others, by providing an approach for the analysis of the impact of over the top (OTT) applications, which operate "over the top" of the network applications, with respect to network performance and power consumption on mobile devices.

According to one example embodiment of the invention, a method performed by wireless communications network test equipment is proposed. The method comprises simulating a wireless network for an application-carrying device separate from the test equipment. The method further comprises monitoring, by the test equipment, a wireless communications interface between the simulated network and the application-carrying device. The monitoring comprises measuring signaling data on a control plane, and measuring application data on a user plane related to at least one application implemented on the application-carrying device, wherein the signaling data and the application data are measured on the basis of a common time reference of the test equipment. The method further comprises establishing cross-layer measurement data based on the measured signaling data and application data.

By way of example, a test environment comprising the test equipment may be configured to provide test results including the cross-layer measurement data in a reproducible, verifiable, etc. manner as conventionally known for test environments. According to some embodiments, the test environment may comprise various test equipment, e.g., as a set of one or more separate hardware devices, which is configured for interaction with a mobile device such as the application-carrying device and analysis of the communication thereof over the wireless interface. The test environment may be configured to simulate in particular a cellular wireless network such as an UMTS or LTE network.

Embodiments of the application-carrying device may comprise a smartphone, tablet, or any other mobile, wireless, portable, handheld, etc. device adapted or configured for communication with the wireless network simulated by the test environment, which may generally also include devices such as surf sticks, a device such as a PC or notebook equipped with such a stick, etc.

By way of example, the application-carrying device may have one or more applications or apps installed. For performing tests, one or more of these applications may be started, running, executed, or in any other way be operable such that a communication with a remote corresponding application server can be performed, e.g., on a regular basis, triggered by particular operational states of the application-carrying device, inputs of an end-user, etc.

By way of further example, the wireless communications interface may comprise a wireless or air interface as defined between a mobile device such as an UE (User Equipment) and a mobile network such as an UMTS or LTE network, for example an Uu interface, and may in particular relate to, in a control plane, radio communication protocol layers including, e.g., RRC layer or layers between a radio communication part of the application-carrying device and an RNC of the (simulated) network. The interface may further define, in a user plane, transport mechanisms for application data, e.g., an IP protocol stack, wherein accordingly transported application or user data may be referred to herein as "IP data", which is intended to also include data being specifically transported as TCP data, RTP data, etc. In fact, higher layer control data, e.g., RTCP data, etc., may also be concerned as user data, as such control data concern control within the OTT application framework and are not related to the control plane of the simulated network.

In accordance with example embodiments, measuring the control plane signaling may comprise capturing signaling (control) messages. For example, RRC signaling messages such as 'RRC Connection Request' or 'RRC Connection Release' may be captured. Generally, message capturing may include monitoring whether a predefined message is sent via the monitored interface, and in that event performing actions such as logging the event, assigning a time stamp to the event, storing at least a portion of the message, analyzing the message or a stored portion thereof, etc.

Additionally or alternatively, measuring the control plane signaling may comprise measuring connection states which can be understood as determining or detecting the presence or absence of a particular state. For example, in an RRC framework, one out of a plurality of connection states including 'Connected', 'Idle', etc. may be determined to be currently established.

For example, message capturing may enable determining a current connection state based on a known state diagram (state machine). The determination can be performed by the test equipment or any other analysis device, and can be performed in real-time, i.e., during the ongoing test, in a post-processing step, a combination thereof, etc. This enables determining the control plane state without having direct access to the internal state machine of the application-carrying device or of an (simulated or real-world) RNC device. No manipulation of said devices is therefore required which might detrimentally affect the test results. During the monitoring/measuring phase and/or the cross-layer measurement data establishing phase, counts may be determined based on the measured data. For example, message counts, connection counts, and/or state counts may be determined. Such counts are determined based on a defined time span, such as the duration of a test case, (combined) length of monitoring/measuring phase/s, etc. The counts may indicate absolute numbers, or relative numbers, e.g., a relative frequency of a state in relation to one or more other states, etc.

In accordance with example embodiments, measuring the control plane signaling data and/or providing the cross-layer measurement data may comprise determining at least one message count, including, e.g., counts of 'RRC Connection Request' and 'RRC Connection Release'. Additionally or alternatively, counts derived therefrom may be generated, such as counts indicating the number of occurrences of connected connection state, idle connection state, C-DRX connection state, etc. Measuring the application data on the user plane may comprise capturing messages (datagrams, etc.) which are related to an application on the application-carrying device. Capturing may include inspection of data packets or messages on at least one of a network layer, transport layer, etc., and may for example comprise inspection of a packet header and/or packet data (e.g., higher level protocol data) on an IP level, TCP level, etc. Inspection may comprise identifying a specific application where the message may be related to. Predefined knowledge may be used for such identification, such as knowledge concerning protocols, ports, combinations thereof, etc. as used by specific OTT applications. For said analysis, no direct access to the application-carrying device or the application server is required. Again, no manipulation of the application-carrying device is therefore required which might detrimentally affect the test results.

According to further example embodiments, measuring application data on a user plane may comprise determining the setup, presence, termination, absence, etc. of an IP (TCP, etc.) connection related to an application available on the application-carrying device. The measurement may be performed based on monitoring the user plane for corresponding messages. The term 'connection' as understood herein may not only relate to connection-oriented control or user plane protocols, such as TCP, but is intended to refer also to connectionless traffic protocols such as UDP. For example, a communication between application and server may be transported based on UDP which could also be detected by the test equipment and is of interest for the tests and may therefore be counted as a 'connection' or an 'active' state of an application in the user plane.

According to further example embodiments, the user plane application data and/or establishing the cross-layer measurement data may comprise determining at least one connection count in the user plane over the wireless interface based on determined connection states during a given time span. Such connection count may be app-specific. For example, in case of a plurality of apps on the application-carrying device, a corresponding list of connection counts can be supported, wherein the list can be predefined or can be adapted automatically based on the detected traffic. A subset of all applications on the app-carrying device and/or detected can be analyzed and output. For example, a (sub)set of those applications relevant for the test purpose of determining network load etc. can be predefined in the test equipment.

By way of example, the common time reference may comprise a clock, clock count, a clock frequency, a time value, time stamps, a timeline, a time span, or combinations thereof. A prerequisite for establishing the cross-layer measurement data is that there is a common time base or time reference available for the measurement of the signaling data, the measurement of the application data, and optionally the measurement of the power consumption. For example, a parallel monitoring of control plane and user plane is as such not sufficient for cross-layer measurements, as long as no associations in time of respective measurement events can be determined in analysis.

By way of further example, the control plane measurements and the user plane measurements, respectively, may be performed on different hardware components of the test equipment, wherein each component has its own independent clock or time reference. Then a common time reference has to be established, for example by synchronizing the various clocks with each other. Such synchronization may include that time stamps or other time indications are assigned to measurements in the control plane and the user plane, respectively, and can be associated to each other by a known mutual relationship in time. The term 'common time reference' is intended to also cover such configurations.

By way of further example, a common time base or time reference can be used to establish one or more relations or associations between the measured signaling data and application data. As an example, parallel measurements may be performed within a common given time span, e.g., a test case duration. For said time span, connection counts may be determined for connections in the control plane and the user plane, respectively, e.g., counts of "RRC connections" and "IP connections". The cross-layer measurement data may then comprise a data set comprising the time span as well as the respective connection counts in the control plane and the user plane, i.e., the cross-layer measurement may generally comprise arranging measurements in the control plane and the user plane with respect to a common time basis or within a common time framework. Further analysis on the basis of said cross-layer measurement data may be performed automated and/or by test personnel. The parallel measurements in the control plane and the user plane may be started at the beginning of a time span, e.g., at a predefined time point set by the test equipment, for example after a preparatory phase which may include a booting of the application-carrying device or otherwise establishing a standard operational mode thereof. Additionally or alternatively, one or more specific events may be predefined which may trigger the start of the measurements.

In accordance with example embodiments, one or more control plane events can be predefined as trigger events. For example, detection of a particular RRC signaling message such as 'RRC Connection Request' may be predefined as a starting event. Additionally or alternatively, one or more user plane events can be predefined as trigger events. For example, detection of an IP message indicating generally a communication between an application and a server, or a detection of an IP message related to a particular application on the application-carrying device and an application server may be defined as a measurement starting point, wherein such communication on user plane implies the existence of a corresponding control plane state such as "RRC connected." Similarly, the measurement phase may end after a predetermined time span and/or may end with the occurrence of a correspondingly predefined event, for example the detection of a particular RRC signaling message such as 'RRC Connection Release'. Further, a monitoring phase may comprise at least one of one or more active measurement phases and waiting phases, wherein the test equipment waits for a specific predefined time point to be reached for starting a (next) measurement phase, a trigger event which may trigger a (next) measurement phase, etc.

According to further example embodiments, the monitoring step or phase may comprise measuring a power consumption of the application-carrying device. For example, the test equipment may comprise a power supply operable to provide power to the application-carrying device during the monitoring phase. The power supply may then measure the power consumption. Additionally or alternatively, power consumption may be measured by a tool on the application-carrying device, e.g., a corresponding app, and may be provided to the test equipment, e.g., by sending corresponding data over the wireless interface to a local server provided by the test equipment. Power consumption data may be included in the cross-layer measurement data, which requires the power consumption be measured synchronized with the common time reference for the signaling data and the application data. The established cross-layer measurement data may be provided for output, storage, presentation, etc. According to various embodiments, the cross-layer measurement data may comprise a time reference such as a time axis, time span, etc. and the signaling data, application data, and optionally power consumption data are set in association to each other via the time reference. For example, control plane states and user plane states can be presented along a time axis. As another example, counts of control plane states and user plane states, respectively, can be established for a given time span.

According to further example, embodiments, multiple monitoring phases may be performed and may contribute to the establishment of the cross-layer measurement data, wherein it is to be understood that each monitoring phase may comprise one or more measurement phases. For example, one monitoring phase may comprise a test case with a defined set of parameters, while another monitoring phase comprises measuring another test case with a different set of parameters. Additionally or alternatively, multiple monitoring phases may be performed, for example, based on at least one of different application-carrying devices and different sets of applications. For example, various mobile devices may be provided with a different set of OTT apps installed in order to test reliability and stability of a network configuration based on the different sets. Further, different parameter settings at the test equipment may comprise sets of network configuration parameters with different values. A network configuration parameter may comprise a timer, for example an inactivity timer. As a specific example, a timer may comprise an RRC release timer. As another example, a timer may relate to establishment and/or release of C-DRX state. Different monitoring phases or test cases may comprise measuring control plane and user plane behavior for differing in one more of these timers with regard to the timer being disabled or enabled, timer values, various combinations thereof, etc. By way of example, the cross-layer measurement data may represent the signaling data and application data for multiple monitoring phases or test cases. Further analysis may be provided, for example statistics based on or comparing the various monitoring phases.

In accordance with example embodiments, a computer program comprises program code portions for performing the steps of one or more of the methods and method aspects described herein when the computer program is executed on one or more computing devices, which may include at least one of, for example, test equipment, a post-processing facility, etc. The computer program (product) or portions thereof may implement an automated test control and/or analysis for one or more test cases which may be performed, e.g., as a batch run and may comprise a post-processing to be started automatically or on user-input. A preparation phase may comprise input of network configuration parameters for the simulated wireless network or sets thereof, monitoring parameters such as durations of the test cases, etc. The input may comprise retrieval from a configuration file prepared by test personnel. Further, the computer program may be provided for download and execution on the test equipment, analysis facility, etc. Additionally or alternatively, the computer program may comprise templates for generation of specific test cases therefrom. Accordingly, the computer program may provide a user the option to select specific values for various parameters to generate a specific test or test sequence. The computer program may be stored on a computer readable recording medium, such as a permanent or re-writeable memory within or associated with a computing device or a removable CD-ROM, DVD or USB-stick. Additionally or alternatively, the computer program may be provided for download to a computing device, for example via a data network such as the Internet or a communication line such as a telephone line or wireless link.

In accordance with further example embodiments, the use of test equipment in a wireless communications network test environment is provided. The use comprises the test equipment simulating a wireless network for an application-carrying device separate from the test equipment; monitoring, by the test equipment, a wireless communications interface between the simulated network environment and the application-carrying device, wherein the monitoring comprises measuring signaling data on a control plane and measuring application data on a user plane related to at least on application implemented on the application-carrying device, wherein the signaling data and the application data are measured on the basis of a common time reference of the test equipment; and providing cross-layer measurement data based on the measured signaling data and application data.

By way of example, the test equipment may comprise separate hardware components for respectively measuring the signaling data and the application data. Additionally or alternatively, the test equipment may comprise a separate hardware component for measuring a power consumption of the application-carrying device. Additionally or alternatively, the test equipment may comprise a separate hardware component for controlling a network configuration of the simulated wireless network. By way of further example, the test equipment may be configured to enable a communication of the application-carrying device with at least one remote application server. For example, the test equipment may provide for an interface to the general Internet to enable communication of various apps installed on the application-carrying device with the respective application services. By way of further example, the abovementioned need is still further satisfied by test equipment of a wireless communications network test environment, comprising a control component configured for automated control of the test equipment including possibly a post-processing facility for performing any of the methods or method aspects described herein.

In accordance with further example embodiments, a data set comprising cross-layer measurement data established according to any of the methods or method aspects described herein, is provided. A cross-layer measurement data set may in particular comprise data for one or more monitoring phases, wherein the data for each monitoring phase comprises cross-layer measurement data based on signaling data and application data as described herein, and wherein the various monitoring phases are based on different network configurations of a simulated wireless network, to enable a comparison of efficiencies of different network configurations in terms of network load, power consumption of the application-carrying device, etc.

A In accordance with further example embodiments, t a wireless communications networks test environment for performing on a control plane and user plane cross-layer measurements of a communication with an application-carrying device such as a smartphone having one or more OTT applications installed, is provided. This may be seen as hybrid between a handset-oriented approach of implementing an analyzer tool on a real-world smartphone in contact with a real network, and a network approach of simulating the effects of a plurality of smartphones onto a simulated network. The hybrid approach comprises measuring the impact of a real-world smartphone onto a virtual network; however, the smartphone can be in contact with real-world application services.

By way of example, the cross-layer measurements are performed externally of the app-carrying device. Instead, existing test equipment as available for wireless network test environments can be employed, such as network analyzers, radio communication testers, etc., with minimum upgrades, although said test equipment may be used for testing mobile devices or network system tests. Accordingly, no analyzer needs to be installed on the mobile app-carrying device which may influence the behaviour thereof or may influence the power measurements. By way of further example, as the application-carrying device can be undisturbed by any monitoring or measurement activities, the device can be configured similar to smartphones or other mobile devices used by standard customers or customer groups of the mobile network in view of which the tests are performed. For example, multiple application-carrying devices can be prepared for representing different customers or user groups. A set of general test cases can be repeatedly performed for measuring the different devices, and/or device-specific test cases can be performed, to arrive, for example, at a set of network configuration parameters which from an overall perspective are optimized with regard to network load, power consumption, etc.

Accordingly, example embodiments of the present invention offer solutions which enable testing varying network configurations, wherein control plane, user plane, and optionally power consumption can be measured when an application-carrying device is in contact with a wireless network. This is in contrast to network analysis where an analyzer tool is installed on an application-carrying device: This does not offer any options for varying a network configuration. Therefore, the handset-oriented approach does not allow an active testing wherein effects of varying network configuration parameters can be tested. From a slightly different perspective, example embodiments of the present invention can be employed for example for the purpose of finding an optimized set of network configuration parameters for any particular real-world network. Therefore, it is not necessarily the application-carrying device which is the "Device under Test" (DUT), but it may be the simulated or virtual wireless network for which various network configurations can be tested.

Further, example embodiments of the present invention differ from conventional test approaches utilizing base station simulators or radio communication testers for radio testing mobile devices, as such equipment normally is not configured to analyze any user plane data; for example, there may be no possibility for any inspection of IP data other than visual inspection on a screen. Even if additional components for analyzing higher layer data can be provided, this may be for the purpose of analyzing a particular application on high protocol layers only. For example, the possibility to set a trigger on, e.g., a specific IP event does not allow measuring or establishing cross-layer data in the sense as discussed herein. By way of example, cross-measurement data can be established which may represent not only measured signaling and application data but may in particular represent one or more relationships or associations between these data. For example, timely coincidences of signaling and application data can be represented by the cross-layer measurement data and can then be used to further identify one or more applications which are particularly relevant concerning the impact onto network signaling load, etc.

Moreover, example, embodiments of the present invention differ from conventional network tests wherein a signaling behavior of a plurality of smartphones is simulated and applied to a virtual network. There is no guarantee that the simulated behavior in fact correctly reproduces the real-world behavior and therefore any results for optimized network configurations are similarly uncertain. However, simulations performed according to various embodiments of the present disclosure could be used to achieve a better understanding of signaling behavior, which could also be used as an input to network/system tests. By way of example, as addressed above, example, embodiments can be understood as closing a gap left by the conventional approaches. In other words, a comprehensive approach of optimizing a network configuration with a view on, e.g., network load and power consumption issues may include that various conventional approaches and the approach discussed herein can be complementary to each other and respective simulations can be combined with each other. Such example embodiments thereby add to fields related to wireless networks and/or mobile devices, namely test process, test setup, OTT apps, network simulation, network configuration, network optimization, etc., which is relevant for MNO/telecom operators, mobile device manufacturers and/or application service providers.

Additionally, example embodiments of the present invention can be implemented cost-efficiently based on minor modifications of existing hardware and/or software—for example, existing test equipment may be upgraded.

BRIEF DESCRIPTION OF THE DRAWINGS

Various example embodiments of the present invention are described in greater detail by way of example with reference to Figures of the drawings, wherein the Figures show only example embodiments of the invention. Identical components in the Figures are marked with identical reference numbers. The drawings show:

FIG. 4 illustrates a table depicting a second presentation example of cross-layer measurement data, in accordance with example embodiments of the present invention.

DETAILED DESCRIPTION OF EMBODIMENTS

Different embodiments will now be described more fully hereinafter with reference to the accompanying drawings, whereby an approach for the analysis of the impact of over the top (OTT) applications, which operate "over the top" of the network applications, with respect to network performance and power consumption on mobile devices is described. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
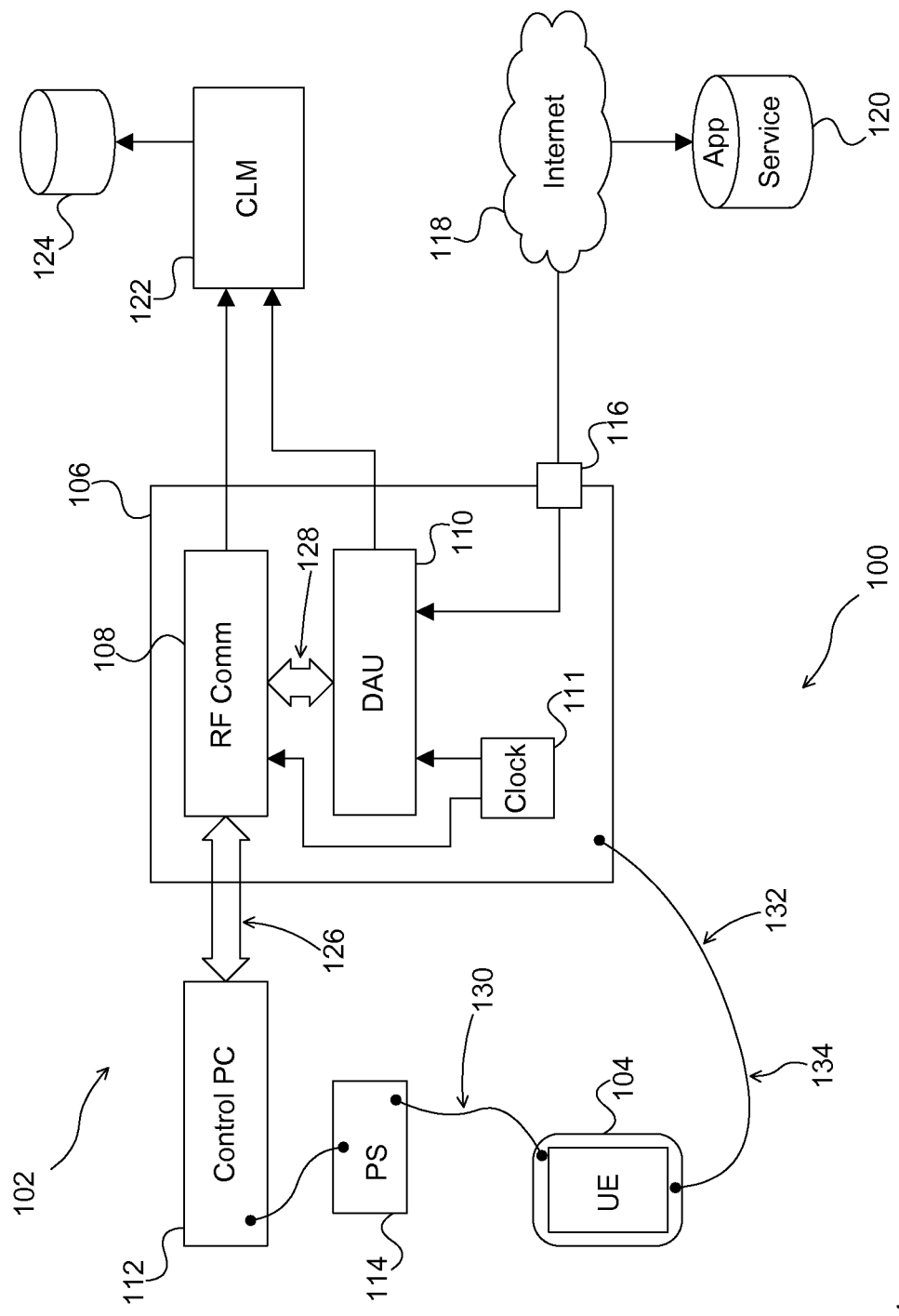
FIG. 1 illustrates a schematic diagram of a wireless communications network test environment, in accordance with example embodiments of the present invention.

FIG. 1 schematically illustrates from a functional perspective an embodiment of a wireless communications network test environment 100 comprising various test equipment 102 having co-located an application-carrying device (User Equipment, UE) 104. The test equipment 102 comprises a hardware stack 106 which may be embodied as a radio communication tester and which includes an RF communication (RF Comm) and RF protocol analyzing component 108 and a data application unit (DAU) or component 110. The hardware stack 106 further comprises an internal clock 111 which provides a common time reference to components 106 and 108. In case one or both of components 106 and 108 have their own internal clock, time reference 111 may at least enable time synchronizing the components 106 and 108 with each other.

The test equipment 102 further comprises a control component 112 which may be embodied as a PC (Personal Computer) or similar general purpose device having software implemented thereon for test control. Further, the test equipment 102 comprises a power supply (PS) 114 for providing power to the device 104 and measuring the power supplied. The test environment 100 further comprises an interface 116, which may be embodied as an I/O hardware interface card available at hardware stack 106, wherein the interface card may provide a conventional LAN-interface, Ethernet interface, an RJ45 connector, etc. The interface 116 enables communication with real-world Internet 118 and at least one real-world application server 120 operated by, e.g., an application service provider.

A post-processing component 122 is provided for establishing cross-layer measurement data from the measurement results of test equipment 102, in particular components 108, 110, 114, as described below. The component 122 can be embodied as a general purpose device such as a PC with analysis software implemented thereon. According to one embodiment, control component 112 and analysis component 122 can be co-located on one PC. Additionally or alternatively, at least a portion of component 122 can be located remote from test environment or test bed 100, but from a purely functional point of view is in any case understood as belonging to test environment 100 and forming part of the test equipment 102. The analysis component 122 can be operable to provide cross-layer measurement data to a storage component 124 for the data being available for presentation, further processing, etc.

The application-carrying device 104 can be embodied as a smartphone, tablet, or other mobile device, i.e., any device with wireless or mobile communication capabilities. As test equipment 102 may be configured to simulate a cellular network, in particular an UMTS or LTE network, the device 104 will occasionally also be referred to as an UE (User Equipment), as this is the conventional term for a mobile device in said network environment.

Test environment or test bed 100 may comprise a LAN 126 which may, for example, connect control PC 112 and test device 106 with each other. Inside device 106, an internal interface 128, which may be proprietary, couples RF control component 108 and data application component 110. Components 108 and 110 may for example forward data to be communicated between mobile device 104 and remote server 120 via the interface 128. The data application unit 110 may exchange data with the Internet 118 via the interface 116.

The mobile device 104 may be supplied with power from power supply component 114 by cable connection 130. RF signals may be transmitted via a cable connection 132 between device 104 and the hardware device 106 including the RF communication component 108 which may act as a base station simulator. Therefore, the wireless communications interface 134 between UE 104 and the (virtual) network simulated by component 108 is bound by wire in test environment 100, which configuration is well known by the skilled practitioner.

An operation of test environment 100 with co-located application-carrying device 104 will further be described with reference to the flow diagram of FIG. 2. Test equipment 102 can be adapted at least in part for RF (radio) communication testing and analysis of mobile devices. However, test environment 100 can also be operable 200 for establishing cross-layer measurement data from measuring the communication between one or more application-carrying devices such as device 104 and remote application services such as that provided by server 120 conveyed via a virtual network provided by test device 106.

Various mobile devices can be measured sequentially or in parallel, depending amongst others on the capacities of virtual network simulator 108. For the tests to be described below, the application-carrying device 104 may be equipped with a set of applications as thought representative for end-users of the network in view of which the tests are carried out. The device 104 may be brought into an operational mode wherein these applications are started in the sense that they may communicate with their associated application servers, for example for update purposes, which does not normally require active end-user input. During execution of the tests therefore not normally any further input by test personnel is required to trigger the applications; it is the background activity of the various applications on device 104 which is monitored.

In step 202, test equipment 112, 108 operates to initiate simulation of a wireless network such as an LTE network or WCDMA network for the application-carrying device 104. The control PC 112 may provide parameters of a radio network configuration including network specific timers to the RF communication component 108, or may directly control component 108 accordingly. The RF communication component 108 operates as an RNC (Radio Network Controller) of the virtual wireless network towards device 104 on the basis of the prescribed parameters.

In step 204 the test equipment 106 monitors the wireless communications RF interface 134 conveyed via cable connection 132. Lower layer including RF control plane communication is ongoing between the virtual network as simulated by test equipment 108 and UE 104, while higher layer including user plane communication is ongoing between Internet 118, 120 and UE 104.

The monitoring step or phase 204 may comprise further steps 206, 208 and 210, respectively, which can be performed in parallel. Step 206 comprises measuring signaling data conveyed over RF interface 134 on a control plane. Measuring may be performed by the component 108 involved in handling the radio communication with UE 104. Step 208 comprises measuring higher layer data on a user plane conveyed via RF interface 134 between UE 104 and the Internet 118. Measuring may be performed by data analysis component 110 which may be adapted, for example, for inspecting data packets such as IP packets. Specifically, measuring may comprise measuring application data related to at least one application which is implemented on smartphone 104 and which may communicate with application server 120, for example, on a regular or periodic basis if running in the background and even if not currently actively used by an end-user. Step 210 comprises the power supply 114 measuring a power consumption of the device 104 during the monitoring/measuring time.

In step 212, analysis and post-processing component 122 retrieves (push and/or pull) measured signaling data, application data and power consumption data from components 108, 110 and 114 during and/or after the end of the monitoring phase 204. On the basis of the retrieved data, component 122 establishes cross-layer measurement (CLM) data, which represent relations between measurements, e.g., events or states, on the control plane and the user plane, respectively.

In order to establish a relation or association between the measured RF signaling data and the measured application data, and to potentially derive further data therefrom such as counts, other statistical measures, etc., the measured data preferably have a common time base or reference, which for example can imply that both data can be set into relation to one and the same common time axis.

In the example illustrated in FIG. 1, measuring of the signaling data in step 206 and of the application data in step 208 is performed by separate components 108 and 110, however on the basis of the common time reference provided by clock 111. As one example for corresponding timing information, time stamps may be assigned by any of the measurement components 106, 108 to a detected event such as occurrence of a particular message. In case the time stamps of control plane events and user plane events, respectively, refer directly or indirectly (via clocks derived therefrom) to one and the same clock 111, the events can readily be compared with each other and relations can be analyzed by the analysis component 122 and/or test personnel. As an example, in view of an event detected in the control plane measurement data and/or corresponding state represented in the cross-layer measurement data, the user plane data may be scanned for events or states co-located in time.

An accuracy in time required for the time reference can be of order milliseconds or several milliseconds, for example 10 milliseconds, which should normally be sufficient to reliably establish relationships between events on the control plane and user plane, respectively. In case of limited accuracy, logic rules could additionally be implemented, for example in the analysis component 122, to conclude from a tight timely occurrence of an event in the control plane, and an event in the user plane, that the control plane event may have taken place prior to the user plane event, even if the timing information associated thereto does not indicate such clear relationship.

The required timing accuracy could be achieved by various measures. While the time reference 111 is shown as a component separate from other components in the example of FIG. 1, according to other configurations a system clock for the test device 106 may be provided on or in one of the measurement hardware components, which may for example imply that one component provides its on-board internal clock to the other measurement components or boards. For example, a data analysis component such as component 110 would be inserted as an additional card or board into the frame (e.g., rack or housing), of a radio communications tester such as device 106 which includes a radio measurement component such as component 108. Any time synchronization may then be performed e.g., via an internal interface such as interface 128.

Besides placing the measurement components in a common hardware framework, other options for supplying a common time reference of sufficient accuracy can be contemplated. For instance, measurement components can be arranged separate to each other in separate frames, housings, etc. in a test environment and can be synchronized via network-based mechanisms, e.g., via LAN-based mechanisms, known as such to the skilled practitioner.

In order that the power consumption measurements can be associated to the measured signaling data and application data, the measurement data from the power supply component 114 also require a common time reference with at least one of the other measurement components 108 and 110. However, it is noted that the power consumption of the application-carrying device 104 may be of primary interest integrated over time (in view of battery life), and therefore the required accuracy of time measurement and time synchronization may be less than required for the signaling and application data.

For instance, a coarse synchronization mechanism may be provided to enable synchronizing the various test equipment of a test environment. In the illustrated example, control PC 112 may provide a coarse common time reference to components 114 and 106, for example a network-based mechanism as outlined above, which may be used by analysis component 122 for associating the cross-layer measurement data resulting from the measurements of device 106 and the power consumption data from device 114 to each other with a desired accuracy. In other words, nested time references can be employed which allow relating the control plane measurements and user plane measurements with a relatively high accuracy to each other, while the power measurements are related thereto with relatively low accuracy.

A measurement campaign may generally comprise multiple monitoring phases. For example with respect to a particular application-carrying device, the phases may differ in the network configuration parameters of the virtual wireless network. In step 214, the control PC 112 decides on whether a further monitoring phase is to follow. If yes, steps 202 to 210 are repeated with one or more different network configuration parameters. Steps 212 and 214 could also be swapped. If required, in repeated step 202 communication may be performed in order that the mobile device 104 may be used to the network with changed network parameters; for example, the device 104 may be triggered performing a handover or re-connecting to another virtual network, etc.

Additionally or alternatively, multiple monitoring phases may relate to different application-carrying devices, which may differ in their set of installed applications. As still another example, one and the same application-carrying device may be configured differently with respect to its active application set for different monitoring phases.

In step 216, the analysis component 122 provides the established cross-layer measurement data, for example to storage component 124, for presentation on a screen, etc.

Figure 2:
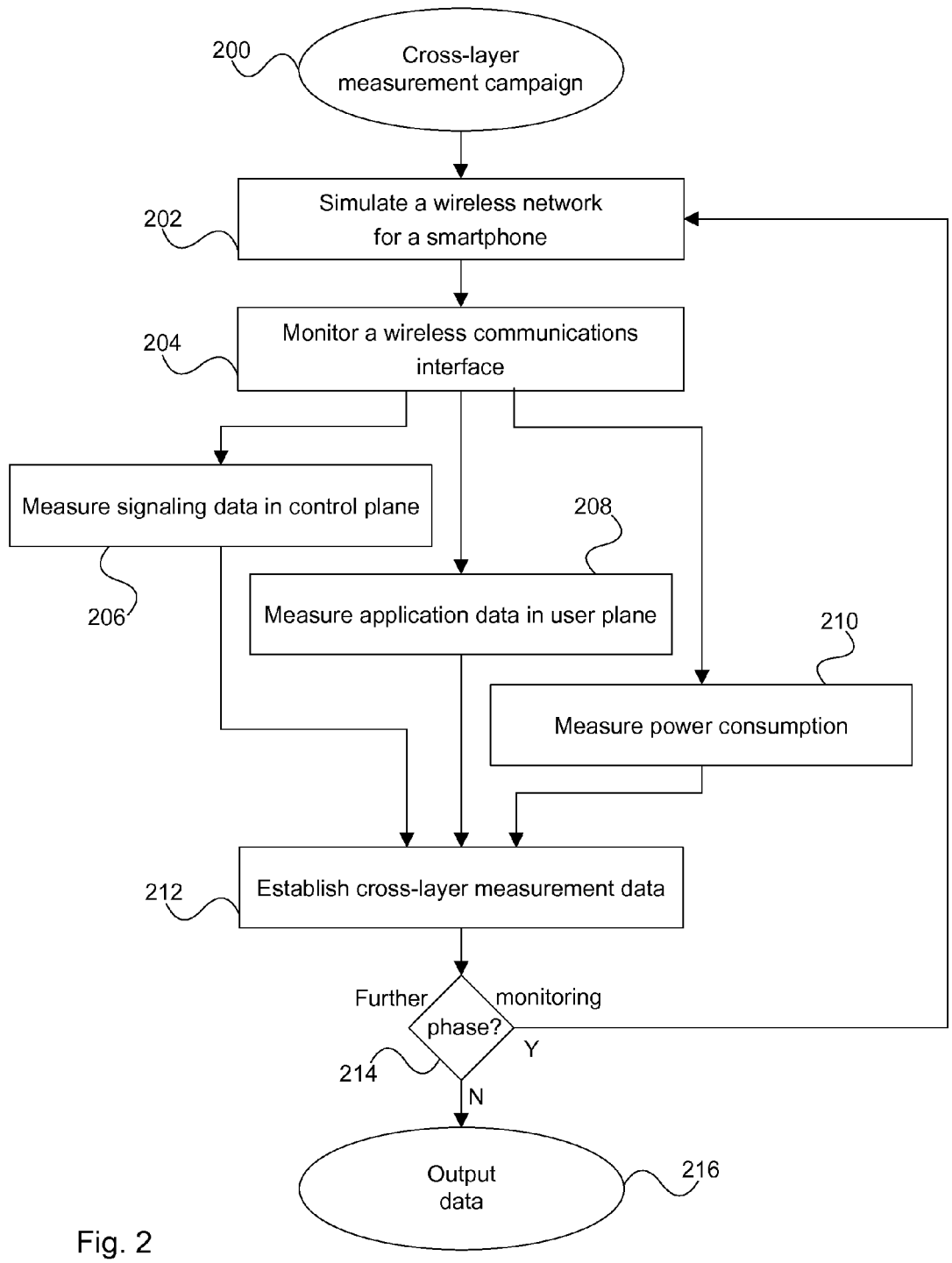
FIG. 2 illustrates a flow diagram of the operation of test equipment of the test environment of FIG. 1, in accordance with example embodiments of the present invention.
Figure 3:
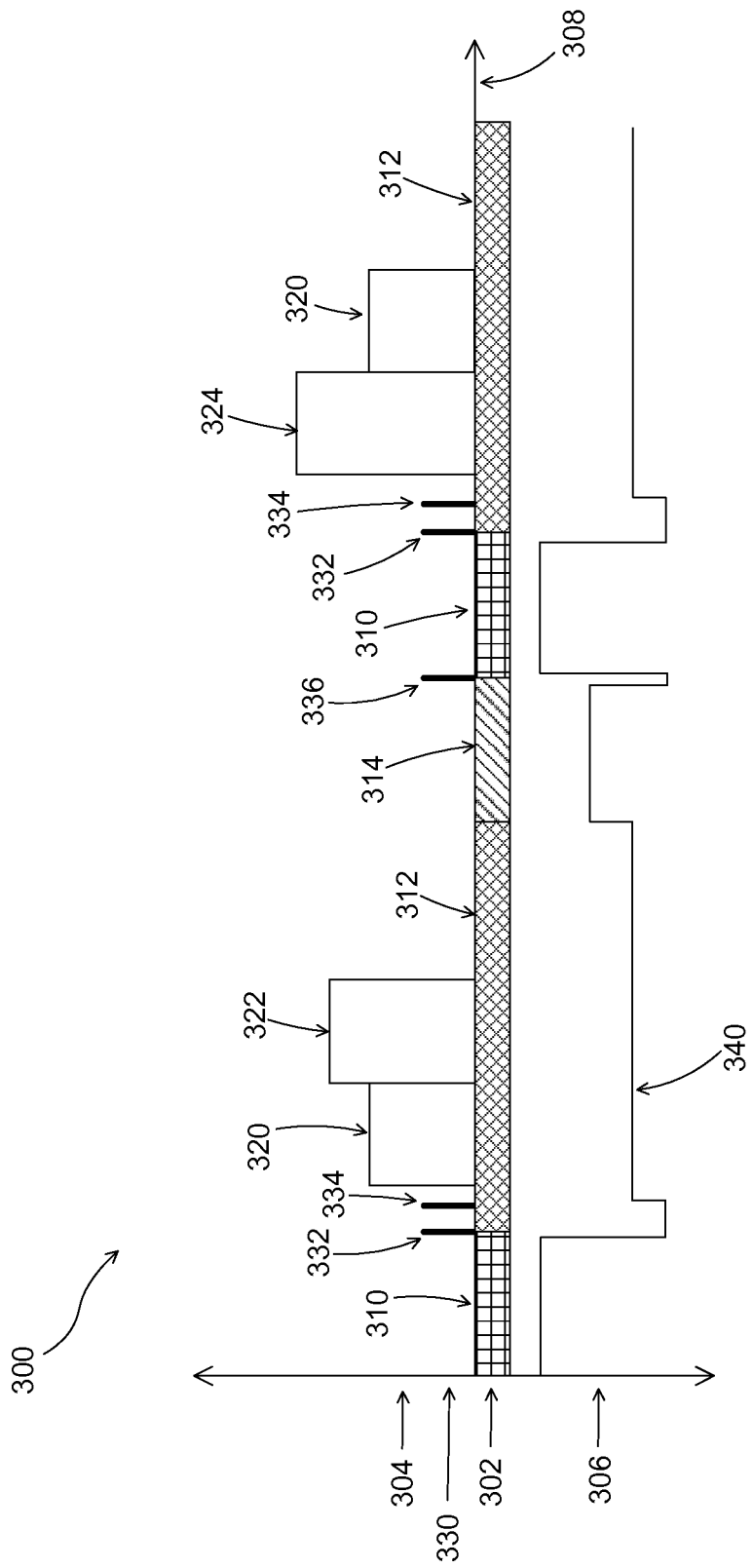
FIG. 3 illustrates a time axis diagram depicting a first presentation example of cross-layer measurement data, in accordance with example embodiments of the present invention.

FIG. 3 illustrates an example of cross-layer measurement data 300 which may have been established on the basis of measurements performed in test environment 100 of FIG. 1 according to measurement campaign 200 of FIG. 2. Control plane events or states are indicated in an area or row 302, user plane events or states are indicated in an area 304, and power consumption is indicated in an area or row 306, wherein axis 308 indicates time in a generally appropriate unit of seconds (s).

Specifically, control plane (signaling) states are represented in area 302 as bars indicating RRC connection states "Idle" 310, "Connected" 312 or "C-DRX" 314, wherein the latter state "Connected—Discontinuous Reception" is known to the skilled practitioner as a battery-saving state. Measuring the various RRC states in the control plane may comprise detecting one or more of predefined messages. For example, detection of "RRC Connection Request" (e.g., with establishment cause "MO Data" indicating that data is to be transferred to the network), and/or a corresponding network response can be interpreted as successful establishment of state "Connected" 312, while detection of "RRC Connection Release" and/or a corresponding response from UE 104 may be interpreted as termination of state "Connected" 312 or "C-DRX" 314 and fallback to state "Idle" 310. At least one of the RF protocol measurement/analysis component 108 and the analysis component 122 may consult a state machine to conclude from one or more detected messages on an RRC state.

Measured user plane (application) data are represented in area 304 of FIG. 3 as boxes, wherein different applications can be assigned boxes of different heights over time axis 308. An application A has assigned boxes 320, an application B has assigned boxes 322, and an application C has assigned boxes 324. Alternative presentations can be contemplated; for example, different applications can have assigned different colours and/or different areas (rows) in the diagram similar to row 302 assigned to the RRC states.

A state determination in the user plane may be based on inspection of IP packet headers and/or data (e.g., higher layer headers). Establishment, presence or termination of an IP connection, TCP connection, etc. may be determined from packet inspection, however, the term 'connection' is to be understood herein as referring to virtually all communications between application and server, which may include the so-called 'connectionless' traffic, for example UDP traffic, within the framework of network protocols. Inspection may allow determining the specific application which currently requires communication. For example, mapping of inspected header data to a predefined table associated to at least one of the data analysis unit 110 and the cross-layer establishment unit 122 may enable identification of specific applications.

For example, the application "active" communication states in the user plane as indicated by the boxes 320, 322, 324 in FIG. 3 not necessarily imply that a large data volume is transferred. For example, the communication between an application on UE 104 and corresponding application server 120 may merely comprise an inquiry whether any updates, or updated data, are available at either one or both of the application server 120 and application-carrying device 104. If no update is available or to be performed, no user data need to be transferred. Such update inquiries or requests may be repeated with frequencies of the order of hours or less, e.g., every 10 minutes or less, for example for particular applications such as related to social networks, but also push services for emails, short messages, etc.

For the cross-layer measurement and analysis, it can be of interest, for example, how often a communication between UE-based application and server takes place, which requires establishment or maintenance of a connection in the radio layers. A presentation such as exemplified with FIG. 3 offers quick insights on the application-related communication via the wireless interface 134, and may provide answers to the question, whether or not the timer settings for maintenance of the 'Connected' and 'C-DRX' states appear to be appropriate for the frequency of application queries or not. Such questions may be answered either via human inspection by eye or machine-based, e.g., via further analysis performed by component 122.

Even a pure query, e.g., a simple connectionless request-response message pair in the user plane, may take of order several seconds as illustrated in FIG. 3. Reasons may for example comprise server latency, e.g., due to load. Therefore the "active" communication states 320, 322, 324 indicating an ongoing communication in the user plane may typically last considerably longer than message exchanges in the control plane, which are depicted by boxes or peaks 332 (RRC Connection Request), 334 (network response), 336 (RRC Connection Release) in row 330 in FIG. 3. As long as the user plane connection's is/are active, the underlying radio connection state normally also has to be active, i.e., in state 'Connected', which amongst others increases power consumption.

Power consumption is depicted in area 306 as a continuous line 340 indicating the momentary amount of power consumed by UE 104. Enhanced power consumption may result from active RRC states 312 and 314, during which reception circuitry is at least partly active. For example, even the C-DRX state comprises cyclical wake up and shut down of receiver circuits. Reception and analysis as well as preparation and transmission of pure control plane and of user plane messages both require power. However, for sake of clarity in FIG. 3 only the RRC message transmission and reception is indicated as being reflected in the power graph 340.

FIG. 3 thus represents cross-layer measurements wherein measurements 302, 304 and 306 in the control plane, user plane, and regarding power consumption, respectively, can be associated to each other via the common time reference indicated by time axis 308. It is the possibility to map or project control plane data and user plane data onto each other via a common time reference which is currently seen as forming an important aspect of cross-layer measurement data. The represented relationships or associations in time of control plane and user plane events or states offer options for further analysis, for example conclusions such as "with the current network timer configurations, a typical sequence of RRC states 'Connected' and 'C-DRX' comprises two active IP connections", or statistical analysis as exemplified in FIG. 4.

The monitoring phase depicted in FIG. 3 was started at an arbitrarily selected time point '0' (zero) followed by a continuous monitoring period or phase. According to an alternative embodiment, a monitoring phase comprising a common measuring phase for signaling data and application data can be triggered by the detection of a predefined control plane message, for example an RRC Connection Request 332. The monitoring phase may then continue a predetermined time span, e.g., several minutes. As a further option, monitoring might be stopped on the detection of, for example, an RRC Connection Release 336. Accordingly, a monitoring may comprise various monitoring phases of only RRC states 'Connected' and 'C-DRX', and a resulting diagram would be similar to that depicted in FIG. 3, except that the periods of state 'Idle' 310 would be removed from the data. However, such diagram could also be achieved purely via post-processing which would also offer the option to switch between the different presentations.

FIG. 4 illustrates another example of cross-layer measurement data 400 which may have been established on the basis of measurements performed in test environment 100 of FIG. 1 according to measurement campaign 200 of FIG. 2. Various state counts are listed in table form, i.e., counts of states in control plane and user plane, respectively, have been determined based on the signaling data and application data measured within several one or more common monitoring periods.

Various testcases 401 are collected in table 400, wherein the testcases 401 differ in network settings, namely in the setting of timer 408 "RRC Release" for sending RRC Connection Release to the UE 104 in case of established RRC connection, and of timer 410 for C-DRX maintenance after inactivity termination of state 'RRC Connected'. Specifically, testcase 402 serves as a basic reference with both timers 408, 410 disabled. Testcase 404 is for measuring a timer value of 5 seconds for the RRC Release timer 408, with C-DRX state disabled. Testcase 406 is for measuring a timer value of 5 seconds for the RRC Release timer 408, followed by C-DRX state for a fixed amount of time.

Each of the testcases 401 has a duration (monitoring phase) 412 of 10 minutes (min) total. For each testcase 401, measurement and analysis data are given for the user plane 414 and the control plane 416, respectively. For the user plane, the number of IP connections 418 and the amount of data transferred 420 are listed per duration 412 and per application 422. The connection count 418 has been calculated on the basis of the application data as measured by data analysis component 110 in FIG. 1. The calculation of the connection count 418 from the measured application data can be performed at the data analysis component 110 or the post-processing component 122 during establishment of the cross-layer measurement data.

For the control plane, a signaling count 424 is listed indicating for each testcase 401 the number of state changes during the measurement campaign or corresponding monitoring phase/s 412. Additionally the relative fractions 426 of states "Connected", "C-DRX" and "Idle" are indicated.

The count 424 has been calculated on the basis of the signaling data as measured by RF communication component 108 in FIG. 1. The calculation of the count 424 from the measured signaling data can be performed at the component 108 or the post-processing component 122 during the establishment of the cross-layer measurement data.

Column 428 lists the average power consumption per test case, i.e., the power consumption averaged over at least the active measurement phases. According to some embodiments, whether or not RRC 'Idle' states are counted may be a matter of indifference as long as the measurement and integration approach is the same for all of the testcases 401. According to other embodiments, 'Idle' states can be counted which would provide more immediate conclusions on battery life.

The cross-layer measurement data of table 400 comprises user plane data 414 and control plane data 416 which are related to each other by parallel measurement or monitoring period/s. Consequently, statistics derived from the measurement data such as the connection counts 418 and signaling counts 424, respectively, can also be related to each other via (total) common measurement time 412. The impact of the OTT application (apps) 422 installed on the smartphone 104 for different network parameter configurations on signalling load and power consumption can then be studied by comparison of the various test cases 401.

For example, the number of IP connections 418 per testcase and/or per application, and per signaling counts 424 can be compared for the various testcases 401, wherein also the resulting average power consumption 428 can be acknowledged for the test cases. An optimum network configuration may be derived by analyzing the cross-layer measurement data, iteratively deriving and performing further testcases and analyzing the data again, etc.

As can be contemplated, establishment and analysis of cross-layer measurement data such as depicted in FIGS. 3 and 4 enables identifying network configurations which optimize, for at least one given set of applications on a smartphone or other mobile device, a signaling load in the network and optionally power consumption on the mobile device (the optimum network configuration may be different whether or not power consumption is taken into account). For example, timer 408, 410 may be set such that several IP connections can be setup and terminated per one RRC connection, which may considerably lower signaling on control plane per IP connection compared to other timer settings. However, it is possible that the minimum signaling load comes at the cost of increased power consumption at the mobile device, such that eventually timer settings may represent a compromise.

As has been demonstrated before, embodiments of the present disclosure allow relations to be identified between L2/L3 control plane/signaling messages and user plane application data, wherein the application data can be assigned to particular applications. Therefore with the establishment of cross-layer measurement data eventually signaling data can be assigned to particular applications. For example, a signaling load per IP connection can be determined. As another example, it would be possible to identify those apps which have the largest impact on network load, power consumption etc., which would in turn allow, for example, defining a set of apps of highest relevance for a given network, which set should be available on application-carrying devices for purposes of tests such as described herein.

Measurement and analysis of an impact of varying network configuration (RNC) parameters on a signaling load and/or on power consumption is provided. For example, it is possible to test, i.e., measure and analyze the impact of specific network configurations such as specific settings of one or more RCNC timers on the quantum of signaling generated by OTT apps. Various embodiments allow in particular testing network specific inactivity timers in the radio access, and accordingly optimizing an RNC behaviour. Specific network parameter values such as for an RRC timer, C-DRX timer can be selected and tested. Impact of network configurations on power consumption of application-carrying devices can also be tested, and accordingly battery life can be optimized.

While the invention has been described in relation to its preferred embodiments, it is to be understood that this description is intended non-limiting and for illustrative purposes only. In particular, while various features have been described separately hereinbefore, particular combinations of those features are apparent to the skilled artisan as being advantageous or appropriate. Accordingly, it is intended that the invention be limited only by the scope of the claims appended hereto.

What is claimed is:

1. A method comprising:
    simulating a wireless network for testing a wireless user device (UE) interfaced with the simulated wireless network;
    monitoring signal communications between the simulated wireless network and the UE, wherein the monitoring of the signal communications comprises measuring control plane signaling data, measuring user plane application data related to at least one application implemented on the UE and measuring power consumption of the UE via an external power supply applied to the UE, wherein at least the control plane signaling data and the user plane application data are measured based on a common time reference; and
    generating cross-layer measurement data based on the measured control plane signaling data and user plane application data, and on the measured power consumption of the UE.

2. The method according to claim 1, wherein the measurement of the control plane signaling data comprises measuring connection states.

3. The method according to claim 1, wherein at least one of the measurement of the control plane signaling data and the generation of the cross-layer measurement data comprises determining at least one message count of a control plane signaling message transmitted over the interface between the simulated wireless network and the UE.

4. The method according to claim 1, wherein at least one of the measurement of the user plane application data and the generation of the cross-layer measurement data comprises determining at least one connection count in the user plane over the interface between the simulated wireless network and the UE.

5. The method according claim 1, wherein the monitoring of the signal communications between the simulated wireless network and the UE comprises triggering a common measuring phase for the measurement of the control plane signaling data and the user plane application data based on detection of a predefined control plane message.

6. The method according to claim 1, wherein the monitoring of the signal communications between the simulated wireless network and the UE comprises multiple monitoring phases based on different network configurations of the simulated wireless network.

7. A test apparatus comprising:
    a simulator configured to simulate a wireless network for testing a wireless user device (UE);
    a clock generator configured to generate a common time reference;
    a power supply configured to supply power to the UE;

a wireless network interface configured to connect the UE to the simulated wireless network and to monitor signal communications between the simulated wireless network and the UE, wherein the monitoring of the signal communications comprises measuring control plane signaling data, measuring user plane application data related to at least one application implemented on the UE and measuring power consumption of the UE via the power supply, wherein at least the control plane signaling data and the user plane application data are measured based on the common time reference; and a processor configured to generate cross-layer measurement data based on the measured control plane signaling data and user plane application data, and on the measured power consumption of the UE.

8. The test apparatus according to claim 7, wherein the measurement of the control plane signaling data comprises measurement of connection states.

9. The test apparatus according to claim 7, wherein one or more of the measurement of the control plane signaling data and the generation of the cross-layer measurement data comprises determining at least one message count of a control plane signaling message transmitted over the wireless network interface.

10. The test apparatus according to claim 7, wherein one or more of the measurement of the user plane application data and the generation of the cross-layer measurement data comprises determining at least one connection count in the user plane over the wireless network interface.

11. The test apparatus according claim 7, wherein the monitoring of the signal communications between the simulated wireless network and the UE comprises triggering a common measuring phase for the measurement of the control plane signaling data and the user plane application data based on detection of a predefined control plane message.

12. The test apparatus according to claim 7, wherein the monitoring of the signal communications between the simulated wireless network and the UE comprises multiple monitoring phases based on different network configurations of the simulated wireless network.

13. A non-transitory computer readable storage medium, containing instructions and other data, which, when executed by one or more processors, cause an apparatus to perform a method comprising:

simulating a wireless network for testing a wireless user device (UE) interfaced with the simulated wireless network via a network interface;

monitoring signal communications between the simulated wireless network and the UE, wherein the monitoring of the signal communications comprises measuring control plane signaling data, measuring user plane application data related to at least one application implemented on the UE and measuring power consumption of the UE via an external power supply applied to the UE, wherein at least the control plane signaling data and the user plane application data are measured based on a common time reference; and generating cross-layer measurement data based on the measured control plane signaling data and user plane application data, and on the measured power consumption of the UE.

14. The non-transitory computer readable storage medium according to claim 13, wherein at least one of the measurement of the control plane signaling data and the generation of the cross-layer measurement data comprises determining at least one message count of a control plane signaling message transmitted over the interface between the simulated wireless network and the UE.

15. The non-transitory computer readable storage medium according to claim 13, wherein at least one of the measurement of the user plane application data and the generation of the cross-layer measurement data comprises determining at least one connection count in the user plane over the interface between the simulated wireless network and the UE.

16. The non-transitory computer readable storage medium according claim 13, wherein the monitoring of the signal communications between the simulated wireless network and the UE comprises triggering a common measuring phase for the measurement of the control plane signaling data and the user plane application data based on detection of a predefined control plane message.

17. The non-transitory computer readable storage medium according to claim 13, wherein the monitoring of the signal communications between the simulated wireless network and the UE comprises multiple monitoring phases based on different network configurations of the simulated wireless network.

* * * * *